Dec. 2, 1947.                 C. F. LUMB ET AL                    2,432,027
              TUBE CLEANING APPARATUS FOR BOILERS AND THE LIKE
                            Filed Jan. 7, 1944
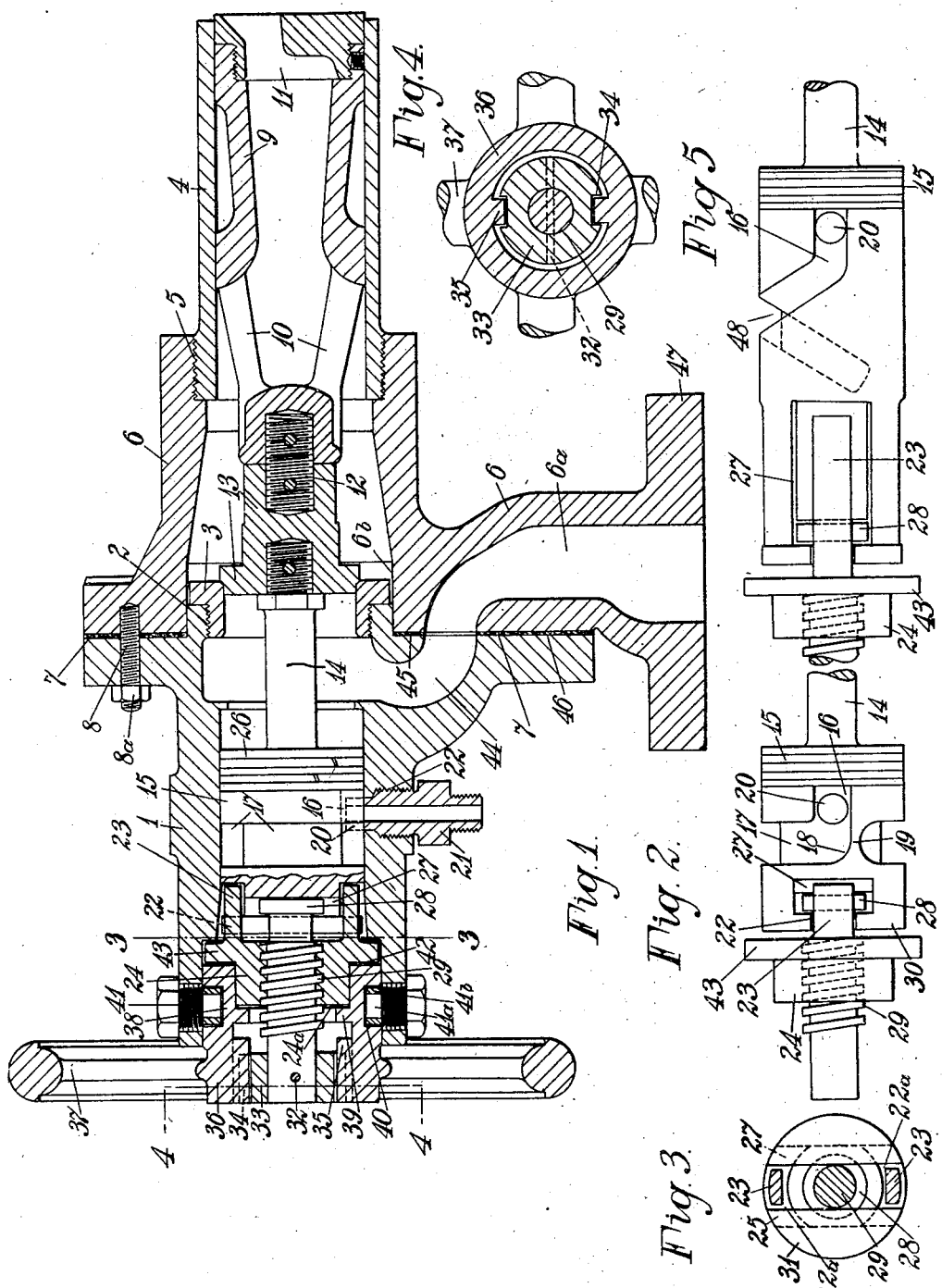
Inventors
C. F. Lumb
F. G. W. Spears
By Glascock Downing & Seibold Attys Patented Dec. 2, 1947

2,432,027

UNITED STATES PATENT OFFICE 2,432,027

TUBE CLEANING APPARATUS FOR BOILERS AND THE LIKE

Charles Fletcher Lumb, Kingston Hill, and Frank George William Spears, Potters Bar, England Application January 7, 1944, Serial No. 517,458
In Great Britain March 22, 1943

8 Claims. (Cl. 15—104.055)

This invention relates to apparatus for cleaning boiler tubes and the like, commonly termed "soot blowers," of the kind employing a steam ejector which is mounted for reciprocation within a steam chest to assume its operative or inoperative position under the control of an operating mechanism comprising a screw threaded spindle cooperating with a nut.

The invention has for its object to provide a modified and improved construction of such operating mechanism.

The invention consists in apparatus for cleaning boiler tubes and the like comprising a hollow casing forming a steam chest, a nozzle reciprocable within the casing to project and retract the nozzle out of and into the casing respectively and rotatable to enable the projected nozzle to partake of a traversing motion and means for producing such reciprocatory and rotary motions consisting of a screw threaded spindle loosely and operatively connected with the nozzle to permit the latter to have rotary motion imparted thereto or be restrained against rotation without altering the connection of the screw threaded spindle with the nozzle and a nut on said spindle also operatively and loosely connected with the nozzle to permit the nut to produce the required rotary motion of the nozzle when the latter is free to rotate and without altering the operative connection of the nut with the nozzle.

The invention also consists in apparatus for cleaning boiler tubes and the like comprising a hollow casing forming a steam chest, a nozzle reciprocable within the casing and also rotatable, and means for producing said reciprocation and rotation, said means consisting of a screw threaded spindle operatively connected with the nozzle and a nut on said spindle also operatively connected with the nozzle, the construction and arrangement being such that the screw threaded spindle is operative to produce a reciprocatory movement of the nozzle when the nut is restrained against rotation while the nut is operative to produce a rotary movement of the nozzle when the latter is free to rotate.

In the accompanying drawings—

Figure 1 is a longitudinal section of one form of apparatus incorporating the invention.

Figure 2 is a plan view looking upon the nut, screw threaded spindle and piston in the positions which they occupy in Figure 1 but with the external parts which normally surround the same removed for the purposes of convenience of illustration.

Figure 3 is a vertical section on the line 3—3 of Figure 1.

Figure 4 is a vertical section on the line 4—4 of Figure 1, and

Figure 5 is a fragmentary view similar to Figure 2 but illustrating a modification according to which the purely circular groove in the piston is replaced by a helical groove.

In carrying the invention into effect in one convenient manner as illustrated in the drawings, a tube cleaning apparatus or soot blower is provided comprising a steam chest 1, in the form of a tubular casing, to the inner end of which there is secured, as by screw-threading 2, a valve seat 3 of ring formation and beyond which a tubular extension 4 of the steam chest is provided and secured, as by screw-threading 5, to a steam branch 6 in turn jointed at 7 to the steam chest by means, for example, of studs 8.

The steam ejector 9 is accommodated within the tubular extension 4 of the steam chest and is in the form of a hollow piston having openings 10 at its outer end, through which steam is passed to the piston interior, and a nozzle 11 at its inner end, through which the steam issues and impinges against the tubes to be cleaned. At its outer end the piston is connected by a tie rod 12 with a block 13 forming the movable valve part of a simple shut-down valve, the fixed seat part of which is the seat 3 referred to and which movable valve part 13 is in turn connected by another tie rod 14 with a piston 15 mounted for movement within the steam chest 1.

The apparatus is adapted to be assembled as a unit and attached to the boiler casing in the manner common to soot blowers but the present construction permits of the whole interior of the apparatus being removed while the connection to the boiler and to the main steam supply is still maintained. That this is so will appear clearer from the remainder of the description of the apparatus but it will be seen from the description already given and from examination of Figure 1 of the drawing in particular that it is only necessary to break the one joint 7, by removal of the nuts 8a from the studs 8, to permit the steam chest and with it the entire interior thereof, including the valve seat, movable shut-down valve member and the steam ejector, to be removed.

The construction of the apparatus to provide for the required movement of the steam ejector is preferably as illustrated particularly in Figure 2 and is such that the first part of the movement of the ejector into the steam projecting or operative position takes place in a straight line or non-rotary manner and if desired to an extent merely sufficient to move the valve from the closed position as shown in Figure 1 to the fully open position. The steam ejector then partakes of a purely rotary movement but at that time the ejector will be receiving a full supply of steam, due to the fully open position of the valve.

In an alternative arrangement as illustrated in Figure 5 the reciprocation of the steam ejector takes place by a straight line or axial motion and by a combined axial and rotary motion.

The construction permitting the operation of the steam ejector such that its reciprocatory movement is purely axial or in a straight line and which is illustrated in Figure 2 in particular is as follows:

The piston 15 on its outer periphery is formed with a groove consisting of a straight portion 16, that is, a portion parallel with the longitudinal axis of the apparatus, and a circular portion 17 both of which merge into one another at one end of the circular groove as seen at 18 in Figure 2 and which circular groove at its opposite end is closed by an end wall 19, constituting part of the piston and serving to arrest the rotary or angular motion of the steam ejector.

Provided for co-operation with the groove portions there is a pin or plug 20 which projects radially inwards from the interior of the steam chest 1 and conveniently constitutes an end extension of the hollow nipple or plug 21 secured to the steam chest by screw-threading 22 to project outside the steam chest and serve as a vent to relieve any steam pressure which tends to be exerted in this neighbourhood. At its outer end, remote from the valve 3, 13, the piston 15 is formed with a slot which is of T-section and is open at the outer end of the leg 22 of the T to receive therein a pair of diametrically opposite tongues 23 which project axially from the inner end of a nut 24 so as to lie in the path of the side walls 22a of the leg of the T-slot and which nut has an internally threaded central bore through which a screw threaded spindle 29 passes. The latter terminates at its inner end in a disc 28 which is accommodated in the cross slot or top 27 of the T. The screw threaded spindle 29 is centrally disposed within the outer end of the steam chest to extend longitudinally therein and be co-axial with the piston and steam ejector and at its outer end the screw threaded spindle is connected, as by a cross pin 32, to a collar 33 which, at diametrically opposite points, is provided with channels 34 in which complementary tongues 35 projecting radially from the interior of a central bore or hub 36 of a hand-wheel 37 engage, such that rotation of the hand-wheel may impart rotary movement to the screw threaded spindle. The central bore or hub of the hand-wheel is extended forwardly towards the steam chest in the form of a co-axial sleeve 38 which fits within the outer end of the steam chest and has on its interior surface a radial flange 39 projecting inwardly therefrom so as to be disposed in the path of the outer end wall 24a of the nut 24. On its outer surface the sleeve 38 is provided with an annular groove 40 in which the inner ends 41a of a pair of set screws or studs 41 engage to prevent endwise or axial movement of the hand-wheel, the said studs being screwed through holes in the outer end of the steam chest and their inner ends being conveniently provided with rollers 41b which serve to take the endwise loads and reduce friction. At its inner end the sleeve 38 of the hand-wheel terminates in a wall 42 which lies in the path of a flange 43 which projects radially outwards from the nut 24.

In its normal and inoperative position the steam ejector will be in the fully retracted position within the tubular extension 4 of the steam branch 6 and, as shown in Figures 1 and 2, the pin 20 will be located within the straight groove portion 16 of the piston 15. In this position of the apparatus, rotation of the hand-wheel 37 in the forward direction to advance or project the steam ejector 9 causes the screw threaded spindle 29 to advance through the nut 24 since the latter is now prevented from rotating due to the engagement of its tongues 23 with the piston, which is itself held against rotation by the interengagement between the said pin 20 and straight groove portion 16. The screw threaded spindle, therefore, during the initial part of the forward rotation of the hand-wheel 37 and by its end disc 28 pushing against the piston, produces a purely axial movement of the steam ejector sufficient to bring the pin 20 into the path of, and at the entrance to, the circular groove portion 17. When this occurs, however, the forward axial movement of the screw threaded spindle will have been arrested by the collar 33 on its outer end being brought into contact with the internal flange 39 on the hub of the hand-wheel with the result that further forward rotation of the hand-wheel causes the nut 24 to be drawn backwards upon the screw threaded spindle to an extent sufficient to take up the clearance shown in Figure 1 and to lock the nut with its flange 43 jammed against the end wall 42 of the hub of the hand-wheel. The nut and hand-wheel are then locked together and continued forward rotation of the hand-wheel causes the nut to be carried around with it since at the time when the two are locked together the pin 20 will be at the entrance to the circular groove portion 17. The second and last part of the forward rotation of the hand-wheel, therefore, produces a purely rotary motion of the steam ejector which is produced through the tongues 23 on the nut acting positively against one of the side walls 22a of the leg of the T slot as the nut is rotated and such rotational movement is arrested when the end wall 19 of the circular groove is brought up against the pin 20. This rotary motion therefore is produced in a positive manner through the medium of the nut rotating with the hand-wheel and by the engagement of the tongues 23 on the nut with the side walls 22a.

Thus in the case of the construction according to Figure 2 the projection of the steam ejector into its operative position takes place first with a purely axial motion, when the nut 24 is held against rotation and then, when the nut is free to rotate, a purely rotary motion of the ejector ensues.

The retraction of the steam ejector into its inoperative position also takes place in two parts produced by the operation of the parts just referred to in the reverse sense and consisting, firstly, of a purely rotary movement of the steam ejector and, secondly, of a purely axial movement thereof. Thus, when the hand-wheel 37 is rotated in the reverse direction the nut 24 while still locked with the hand-wheel will produce rotation of the steam ejector until its rotation is arrested by the end wall 19 at the entrance to the circular groove 17 being brought up against the fixed pin 20, which is still located within the circular groove portion 17. When this occurs further rotation of the steam ejector and of the nut is prevented and the lock between the nut and the hub of the handle will be broken as, during further rearward rotation of the hand-wheel, the nut moves along the screw threaded spindle and causes the flange 43 thereon to move away from the end wall 42 of the hub of the hand-wheel and at the same time causes the locking engagement between the outer end wall 24a of the nut and the internal flange 39 on the hub of the hand-wheel to be broken. When this has occurred and the nut is returned to its normal position, as seen in Figure 1, continued rotation of the hand-wheel in the reverse direction will, through the medium of the disc 28 on the end of the screw threaded spindle exerting a pulling action against the end part 30 of the piston, cause the latter, and with it the steam ejector, to partake of a purely axial motion which is permitted as the stop pin 20 is now in line with the straight groove portion 16 so that the piston is free to be moved axially and retracted to its original position, as seen in Figure 1, where the valve 13 is engaged firmly on its seat 3 and the steam supply to the blower which is admitted through the conduit 6a in the steam branch 6 is cut off.

As above stated, however, the construction may be modified to permit the steam ejector, in its forward movement, to travel first in a straight line or axially and then with a helical motion. Such a modified construction is illustrated in Figure 5 according to which the piston is formed on its periphery with the straight groove portion 16 and the latter merges into a helical groove 48, while the tongues 23 on the nut and the cross slot or top 27 of the T-slot are prolonged to provide for the axial movement of the piston which occurs simultaneously with the rotary movement thereof when the pin 20 is located within the helical slot.

An endwise or purely axial movement of the handwheel is prevented by the set pins 41a and, as already stated, by forming the stop pin 20 on a plug 21 which has a central bore 21a, it is possible to utilise the bore to act as a vent for relieving any steam pressure which may be built up behind the piston.

The piston 15 is formed at its inner end with an annular ledge 26 which is presented to the steam admitted to the steam chest through the steam inlet 44, via a bore 6a in the steam branch 6, and if the area of the ledge is greater than that of the inner end surface of the shut-down valve or of the ejector at the opposite end of the steam chest, there will be a rearward loading of the piston by the steam, with respect to the direction of flow of the steam to the ejector, and as a consequence the piston will tend to be maintained in close frictional engagement with the disc 28 at the inner end of the screw threaded spindle 29.

We claim:

1. In an apparatus of the character described, a hollow casing, a nozzle reciprocally and rotatably mounted in said casing, a threaded spindle operable to impart movement to said nozzle and disposed coaxially and rotatable relative to said nozzle, a nut threaded on said spindle and slidably and rotatably engaged with the nozzle, an actuating member for said spindle rotatably supported in said casing coaxially of said nozzle and frictionally engageable by said nut to impart rotation thereto, means operable in one axial position of said nozzle to prevent rotation thereof, said spindle being operable through said nut to impart axial movement to said nozzle when the latter is in said axial position, and abutment means operable in another axial position of said nozzle to render said spindle effective to draw said nut into frictional engagement with said actuating member whereby rotary movement of the latter is imparted to said nozzle.

2. An apparatus as claimed in claim 1 wherein said means to prevent rotation of said nozzle is constituted by a hollow pin connected to serve as a steam vent.

3. An apparatus as claimed in claim 1 wherein the last mentioned means is constituted by a flange on the actuating member and an abutment movable with said spindle into engagement with said flange.

4. An apparatus as claimed in claim 1 wherein said last mentioned means includes a flange formed internally of said actuating member and an abutment movable with said spindle into engagement with said flange.

5. An apparatus as claimed in claim 1 wherein said nut is provided with axial extensions non-rotatably engaged with said nozzle and with a peripheral projection engageable frictionally with the actuating member.

6. An apparatus as claimed in claim 1 wherein said nut includes actual projections engaged with the nozzle and a peripheral projection confined between the casing and the adjacent portion of the actuating member.

7. An apparatus as claimed in claim 1 wherein said nut includes actual projections engaged with the nozzle and a peripheral projection confined between the casing and the adjacent portion of the actuating member, said abutment means including an internal projection on the actuating member and an abutment member on the spindle mutually coacting to draw said peripheral projection against said actuating member.

8. An apparatus as claimed in claim 1 provided with means to prevent said actuating member from participating in the axial movement of said spindle.

CHARLES FLETCHER LUMB.
FRANK GEORGE WILLIAM SPEARS.

REFERENCES CITED

The following references are of record in the file of this patent:

UNITED STATES PATENTS

| Number | Name | Date |
| --- | --- | --- |
| 2,008,510 | MacConville | July 16, 1935 |
| 2,114,673 | Brisbane et al. | Apr. 19, 1938 |
| 2,269,802 | Wilson | Jan. 13, 1942 |
| 2,298,995 | Wilson | Oct. 13, 1942 |
| 2,330,020 | Wilson | Sept. 21, 1943 |
| 2,355,570 | Spears | Aug. 8, 1944 |